Feb. 3, 1970     L. BRANCALE     3,493,925

POSITION INDICATING SYSTEM

Filed Feb. 14, 1968     2 Sheets-Sheet 2

INVENTOR.
LOUIS BRANCALE

BY Morgan, Finnegan, Durham & Pine
ATTORNEYS.

United States Patent Office 3,493,925
Patented Feb. 3, 1970

3,493,925
POSITION INDICATING SYSTEM
Louis Brancale, 215—11 32nd Road,
Bayside, N.Y. 11361
Filed Feb. 14, 1968, Ser. No. 705,517
Int. Cl. G01d 1/00
U.S. Cl. 340—61                                    3 Claims

ABSTRACT OF THE DISCLOSURE

A position indicating system is provided in which a magnetic proximity switch is disposed in a fixed position relative to one of a pair of relatively movable objects, the switch operating in response to positioning of the objects at a prescribed minimum distance from each other, to energize an electric signalling circuit of the system to give an audible or visual alarm signal indicative of the minimum clearance position of the objects relative to each other.

---

This invention relates to position indicating systems for visually or audibly indicating the proximity of one solid object relative to another and relates more particularly to a novel magnetically-actuated position indicating system of utility especially for the parking and garaging of motor vehicles.

During the last decade, the size of motor vehicles in general and automobiles in particular has increased substantially. Consequently, many parking facilities which were adequate a decade ago are now only marginally adequate. It is one object of this invention to provide the operator of a motor vehicle with an indication when the motor vehicle is proximate to a solid object such as the side or end wall of a garage.

It is recognized that there are existing devices which have been used to alert the operator of a motor vehicle to the proximity of a solid object. However, almost every such device requires a physical contact in order to alert the operator. These devices are characterized either by an element projecting from the motor vehicle which will contact a nearby solid object or by an element projecting from the nearby solid object which will contact the motor vehicle.

It is an object of this invention to enable an operator of a motor vehicle to be alerted to the proximity of a solid object without the necessity for a physical contact. This is a significant improvement over prior art contact devices. Those contact devices which were mounted on the motor vehicle often adversely affected its resale value because, if left attached, they reduced the aesthetic appeal of the vehicle or, if removed, they often left unsightly holes or discolorations. Those contact devices which were attached to the solid object, such as the wall of a garage, had the disadvantage of causing a wearing away of either the chromed or painted areas of the vehicle, again reducing its resale value. This invention eliminates those problems.

Each year the public faces ever increasing numbers of motor vehicle accidents. One way to prevent these accidents is through improved driver education and instruction. It is therefore, another object of this invention to facilitate the instruction of drivers, particularly in the parking of motor vehicles, by providing a portable position indicator which can be attached to a rubber pylon or similar object and positioned in a large open area and used to simulate the presence of other parked cars or a curb, thereby obviating the necessity for initially practicing on a street, with its attendant dangers. Similarly, the device could be used to train operators of larger motor vehicles, such as tractor-trailers, who may be accomplished operators of automobiles but who are just learning the intricacies of maneuvering such larger vehicles.

Although this device has been described in the environment of motor vehicles, it is not to be construed as limited to such an evironment. For example, two of these devices could be electrically connected in series and spaced apart, in an elevator shaft, a distance approximately equal to the height of an elevator car. Unless the elevator car were positioned opposite both of the devices, they would not both be activated at the same time. The doors of the elevator car could be programmed so as not to open unless both devices were activated, thereby preventing the opening of the elevator doors between floors. This could be implemented by having a photocell mounted in the side of the elevator car which would be activated only when both switches were closed and the light controlled by both switches was activated.

The accompanying drawings show, for the purpose of exemplification without limiting the invention or claims thereto, certain practical embodiments of the invention wherein:

Figure 4:
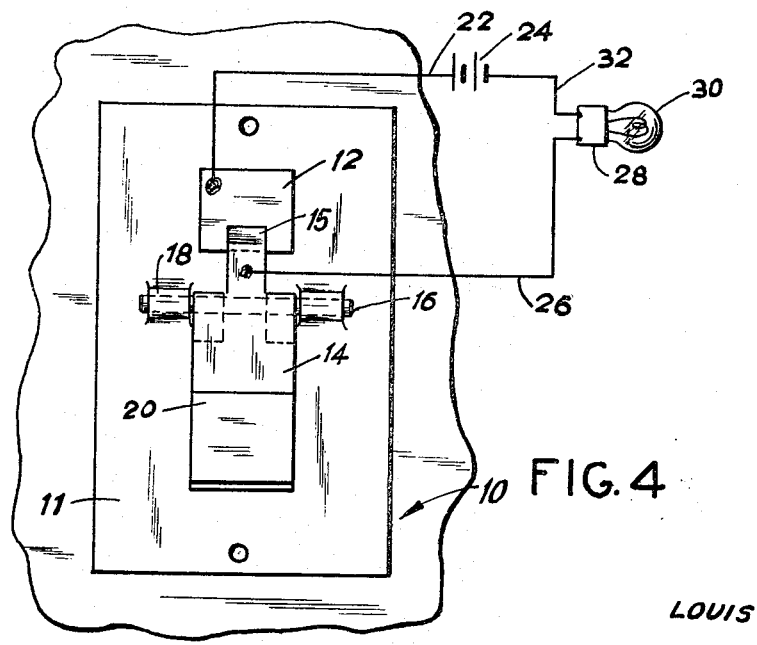
FIGURE 4 is a fragmentary view in front elevation of elements comprising one embodiment of the invention.

Referring now more particularly to FIGURE 4, there is pictured a magnetic proximity switch system shown generally as 10 having a base 11 for the elements comprising the magnetic proximity switch, said base being composed of an electrical insulating material. A fixed metal contact member 12 having a contact end 15 is attached to the base 11. A second movable metal contact 14 is pivotally mounted to a rod 16, said rod being secured to the base 11 by journals 18 in such a manner as to allow the movable contact 14 to pivot about rod 16. A permanent magnet 20 is attached to one end of movable contact 14. The contact member 12 and 14 and magnet 20 form a normally-open magnetic switch.

An electrical conducting element 22 is attached to contact 12 and to one terminal of a battery 24. A second electrical conducting element 26 is attached to movable contact 14 and to one terminal of lamp socket 28, said lamp socket containing a lamp bulb 30. A third electrical conducting element 32 is attached to the second terminal of battery 24 and to the second terminal of lamp socket 28 so that the magnetic switch, battery and lamp form a normally-open series circuit.

Figure 3:
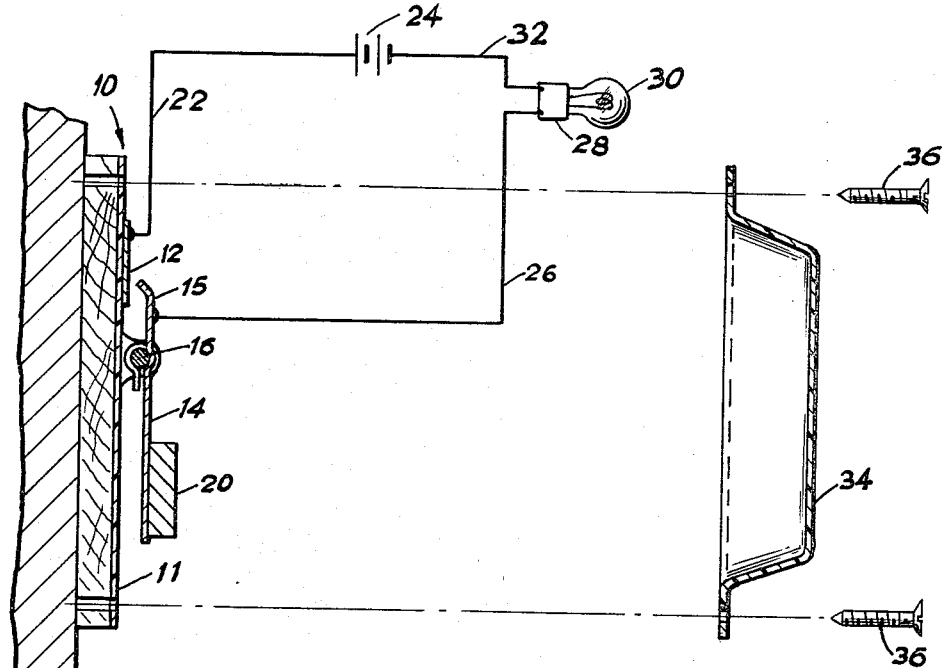
FIGURE 3 is a fragmentary, exploded view, partly in section, and on an enlarged scale of elements comprising one embodiment of the invention.

Referring now to FIGURE 3, there is pictured a cover 34, which protects the elements of the magnetic proximity switch, and screws 36, which serve to secure the cover 34 to the base 11 and may also secure the entire switch to a supporting structure. It will, of course, be understood that the cover 34 will be formed of non-magnetic materials.

Figure 2:
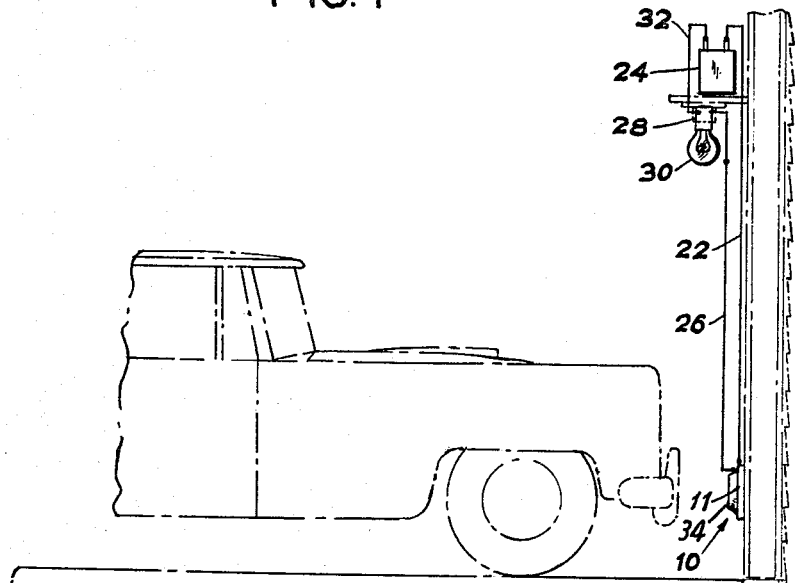
FIGURE 2 is a fragmentary view in side elevation of a vehicle stopped before a position indicator mounted on the rear wall of a garage such as is shown in FIGURE 1.

FIGURE 2 depicts the magnetic proximity switch mounted on the rear wall of a garage. As the automobile approaches the switch, the magnet 20 will be attracted to the metal in the body of the automobile. The magnet is attached to movable contact 14 and the movement of the magnet will cause the contact 14 to pivot about the rod 16. When this happens, the end 15 of contact 14 remote from magnet will physically impact upon contact 12, thereby completing the circuit through conductor 22, battery 24, electrical conductor 32, lamp socket 28, lamp bulb 30 and electrical conductor 26 so as to light the lamp bulb 30. At this time the operator of the automobile will know that sufficient forward progress has been made into the garage and that proper positioning of the automobile can be effected by shifting into reverse and backing up until the light is extinguished.

Figure 1:
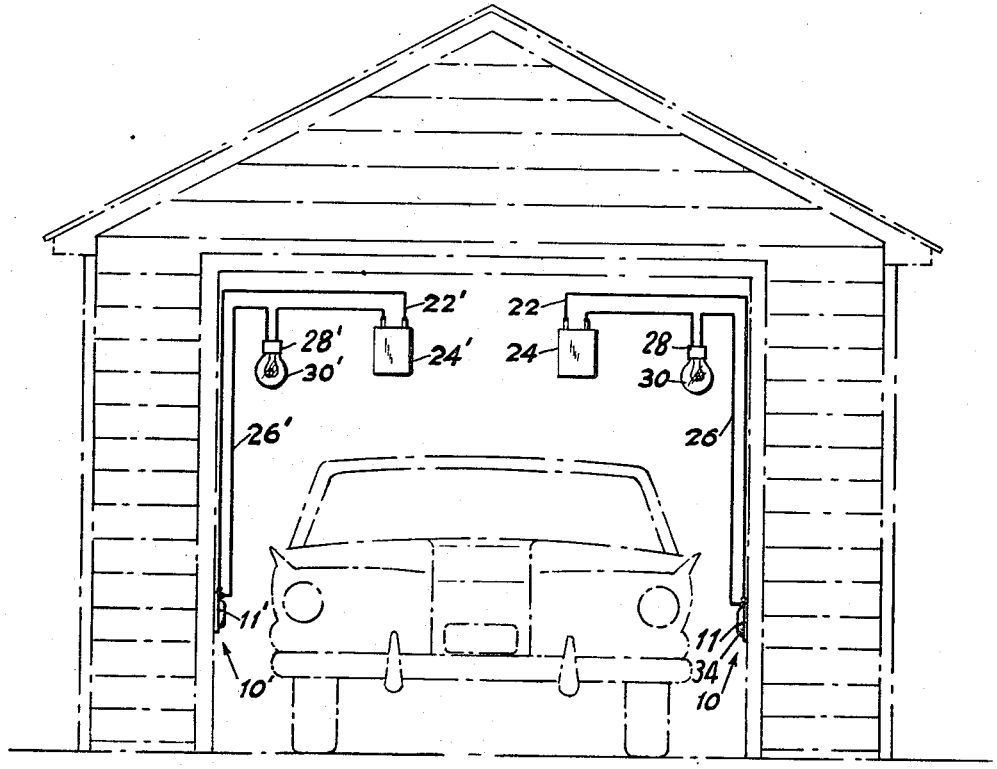
FIGURE 1 is is a view in front of elevation of a typical garage and a vehicle properly introduced into the garage and centered between two position indicators of this invention.

FIGURE 1 shows the use of two position indicating systems, each identical to that shown in FIGURE 4, mounted on either side of the garage entrance. If the automobile approaches too closely to the right side of the entrance, the magnet 20 will be attracted to the body of the car, closing the signalling circuit as described above. If the automobile approaches too closely to the left hand side of the garage entrance, the system on that side will be activated. When the light on one side or the other of the garage which has been too closely approached is activated, the alerted operator will then be able to take the appropriate corrective measures. For purposes of illustration, the system on the left hand side of the garage entrance way shown in FIGURE 1 is identified by the use of primed numbers, e.g. 10', to indicate correspondence with the system and elements shown on the right hand side.

It is to be understood that this is but one embodiment of the invention and the particular environment in which it is used will dictate certain desirable variations. For example, a preferred embodiment of the invention would utilize both visual and audible means, or a combination of both, for altering the operator of a motor vehicle. The audible indication might be produced by a conventional buzzer or bell. Also, if the position indicator is to be used for driver instruction purposes, it would be desirable to have the source of current, the indicator or indicators, and the magnetic proximity switch in a single compact package for ease of portability. If, on the other hand the invention is to be restricted in its use to a single location where a convenient source of power is available, for example in a garage, then the battery could be replaced with a simple transformer to reduce the normal 110–120 volt power to a lower and safer voltage level. In this latter case, it would also no longer be necessary to have the magnet 6 a permanent magnet; it could be an electromagnet which would be continuously energized.

I claim:
1. A vehicle position indicating device for indicating when a vehicle is less than a certain minimum distance from a stationary object, comprising:

a magnetic proximity switch including:
   a pivotal member;
   a permanent magnet attached to said pivotal member;
   a stationary contact; and
   a movable contact attached to said pivotal member in cooperative relation with said stationary member;
   said pivotal member normally being in an open contact position;
a source of electrical power;
indicator means;
electrical circuit means connecting said stationary and movable contacts in series with said source and said indicator means so that said indicator means is activated when said pivotal member moves said movable contact into engagement with said stationary contact;
means attaching said proximity switch to the stationary object at a location corresponding approximately to the metallic portion of the vehicle so that when the vehicle is less than a predetermined distance from the stationary object said permanent magnet is attracted to the vehicle to move said movable contact into engagement with said stationary contact.

2. An indicating device according to claim 1 wherein said pivotal member is balanced so that gravity normally maintains said pivotal member in the open contact position.

3. An indicating device according to claim 1 wherein said indicator means provides a visual indication.

References Cited

UNITED STATES PATENTS

| | | | |
|---|---|---|---|
| 2,122,253 | 6/1938 | Humphreys | 340—38 |
| 2,149,998 | 3/1939 | Jones | 335—205 |
| 2,489,113 | 11/1949 | Veenstra | 200—87 |
| 2,569,529 | 10/1951 | Kirk | 116—28 |
| 3,325,756 | 6/1967 | Maxwell | 335—205 |
| 3,395,387 | 7/1968 | Durant | 200—61.41 |

LOUIS J. CAPOZI, Primary Examiner

U.S. Cl. X.R.
116—28

PO-1050
(5/69)

UNITED STATES PATENT OFFICE
CERTIFICATE OF CORRECTION

Patent No. 3,493,925    Dated February 3, 1970

Inventor(s) L. Brancale

It is certified that error appears in the above-identified patent and that said Letters Patent are hereby corrected as shown below:

Column 3, line 25 -

After the word and, insert - - that - -

Column 3, line 29

"altering" should be - - alerting - -

SIGNED AND
SEALED
JUL 14 1970

(SEAL)
Attest:

Edward M. Fletcher, Jr.
Attesting Officer

WILLIAM E. SCHUYLER, JR.
Commissioner of Patents